United States Patent
Kozlowski (10) Patent No.: US 10,632,878 B2
(45) Date of Patent: Apr. 28, 2020

(54) DYE TRANSFER MITIGATION

(71) Applicant: Magna Seating Inc, Aurora (CA)

(72) Inventor: Eric Kozlowski, Oakland Township, MI (US)

(73) Assignee: Magna Seating Inc, Aurora, Ontario (CA)

( * ) Notice: Subject to any disclaimer, the term of this patent is extended or adjusted under 35 U.S.C. 154(b) by 0 days.

(21) Appl. No.: 16/197,478

(22) Filed: Nov. 21, 2018

(65) Prior Publication Data

US 2019/0152363 A1 May 23, 2019

Related U.S. Application Data (60) Provisional application No. 62/589,903, filed on Nov. 22, 2017.

(51) Int. Cl.
*B60N 2/58* (2006.01)
*B60N 2/56* (2006.01)

(52) U.S. Cl.
CPC ......... *B60N 2/5657* (2013.01); *B60N 2/5642* (2013.01); *B60N 2/58* (2013.01)

(58) Field of Classification Search
CPC ....... B60N 2/5657; B60N 2/5642; B60N 2/58
See application file for complete search history.

(56) References Cited

U.S. PATENT DOCUMENTS

| | | | |
|---|---|---|---|
| 7,406,832 B2* | 8/2008 | Wiedemann | B60H 3/0078 62/264 |
| 8,256,236 B2* | 9/2012 | Lofy | B60N 2/5657 62/150 |
| 9,989,267 B2* | 6/2018 | Brykalski | F24D 19/1096 |
| 10,029,797 B2* | 7/2018 | Space | B64D 11/0626 |
| 2005/0200166 A1 | 9/2005 | Noh | |
| 2016/0040260 A1 | 2/2016 | Steele | |
| 2019/0152363 A1* | 5/2019 | Kozlowski | B60N 2/5657 |

* cited by examiner

*Primary Examiner* — Philip F Gabler
(74) *Attorney, Agent, or Firm* — Miller Canfield (57) ABSTRACT

A system and method of active stain prevention for an automotive seat which reduces visible staining on automotive seating surfaces by adding ozone to a ventilation system within the automotive seat.

20 Claims, 9 Drawing Sheets

DYE TRANSFER MITIGATION

CROSS-REFERENCE TO RELATED APPLICATIONS

This application claims priority to U.S. Provisional Application No. 62/589,903, filed on Nov. 22, 2017.

BACKGROUND OF THE INVENTION

1. Field of the Invention

The present invention relates to an automotive seat which reduces visible dye transfer staining on a seat surface. More particularly, the invention relates to an automotive seat having an ozone generator in an air handling system to reduce the visible staining on seat surfaces.

2. Description of Related Art

Soiling of automotive seating surfaces is a common complaint by automobile owners. Various methods and materials to minimize and/or prevent soiling and/or staining of seating surfaces are known in the art. Current solutions may use topical coatings on the leather, vinyl or cloth material forming the seating surface to prevent staining. However, the topical coatings may wear off during use, and the seating surfaces will soil when the protective coatings are damaged or worn off.

Other solutions focus on the cleanability of surfaces. Good cleanability may require hard glass-line finishes on leather and vinyl which may affect the tactile feel of the seating surface. Also, even though soiling may be removable from these surfaces, currently known finishes may not prevent staining of light colored leathers and vinyl. Additionally, These example coatings and finishes may not reduce staining of the leathers and vinyl by sulfur-based Indigo Blue dye commonly used in denim production.

It is desirable, therefore, to reduce visible staining of leathers and vinyl caused by dye transfer. It is also desirable to reduce visible staining without adding coatings or finishes to the leathers and vinyl that could affect the tactile feel. Further, it is desirable to reduce visible staining even when applied coatings and/or finishes are damaged or worn. Finally, it is desirable to have a system integrated into existing air handling systems in automotive seating.

SUMMARY OF THE INVENTION

A system and method of active stain prevention for an automotive seat which reduces visible staining on automotive seating surfaces by adding ozone to a ventilation system for an automotive seat.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
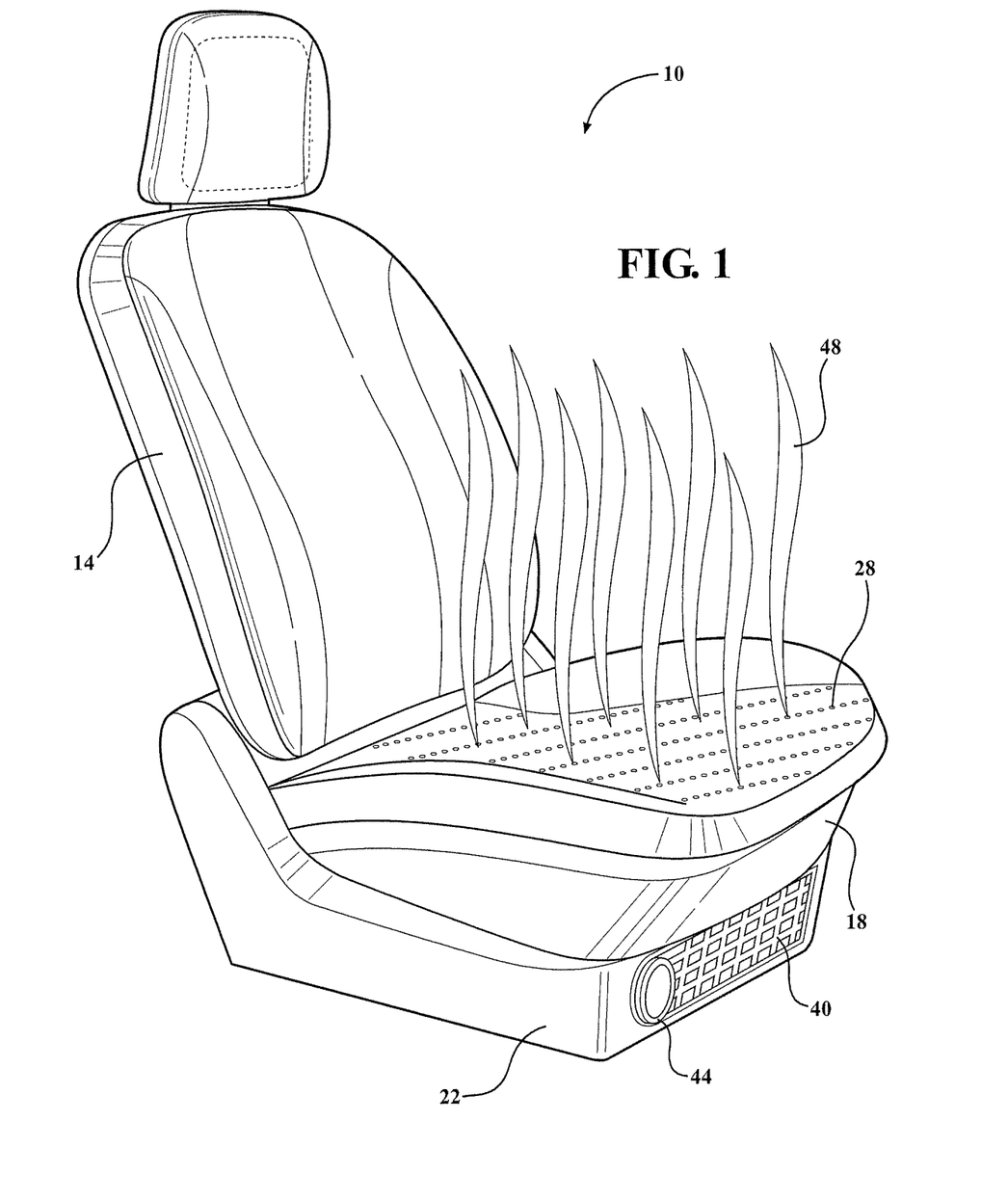
FIG. 1 illustrates a perspective view of an automotive seat according to one embodiment of the present invention.
Figure 10:
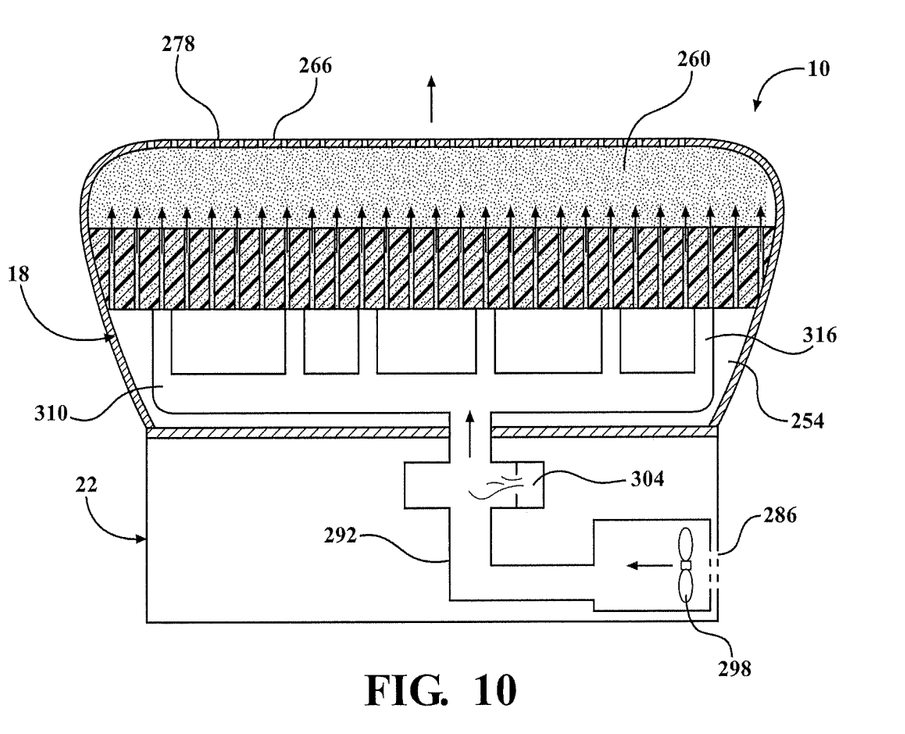
FIG. 10 illustrates a schematic side view of seat base on according to one embodiment of the present invention.

Referring to the Figures, wherein like numerals indicate like or corresponding parts throughout the several views, FIG. 1 illustrates a perspective view of a ventilated seat 10 with active stain prevention for an automotive vehicle (not shown), according to an embodiment of the present invention. The ventilated seat has a seat back 14, a seat cushion 18, and a seat base 22. The seat cushion 18 may be covered with a trim cover 28 defined by a layer of perforated leather, vinyl, cloth and/or other fabrics and materials. The ventilated seat 10 may have an air intake and/or exhaust 40 on an outer surface of the seat base 22. Further, the seat base 22 may have an intake and/or exhaust blower fan 44 to exchange airflow between the seat base 22 and a surrounding environment. Airflow channels and/or airflow ducts (not shown) may direct airflow between the air intake 40, through the seat base 22, and/or through the seat cushion 18, and passing through perforations in the seat cushion trim cover 28. The blower fan 44 may be positioned on an outer surface of the seat base 22 or may be positioned within an airflow channel in the seat base 22. Alternatively, the airflow channels may be fluidically coupled with an airflow supply duct (not shown). As generally shown in FIG. 1, airflow may enter through the air intake 40 and/or through the blower fan 44, pass through airflow channels within the seat base and seat cushion (not shown), with airflow 48 passing through the perforated cushion trim cover 28. Active stain prevention may be incorporated within the seat 10. A cross-sectional schematic view of a lower portion of a ventilated seat having active stain prevention is shown in FIG. 10, and will be described in more detail below.

Often the seat cushion trim cover 28 comprises leather, vinyl, or other material with a light color such as white, off-white, tan, light gray, and other similar colors. Soiling of seating surfaces is a complaint by automobile owners. Light color leather may be sensitive to dye transfer from fabrics in contact with the leather. Improved products in the leather industry are available. However, known products may not permanently prevent dye transfer. Further, existing products may not be robust as the products wear and are damaged. One common problem is blue jeans staining light colored seat cushion trim covers 28.

Some current solutions generally known in the art use topical coatings. However, coatings eventually wear off, and thus, coatings are a short term solution. Once a protective coating is disrupted, the coated surface will begin to stain. Typically, testing to demonstrate the effectiveness of generally known topical coatings is done on fresh leather and not on worn leather. These protective coatings may perform unsatisfactory when the coatings are worn, damaged, and/or the leather is worn.

Some automotive manufacturers focus on cleanability of surfaces. Good cleanability often requires hard glass-like finishes on leather and/or vinyl. These hard glass-like finishes may affect the tactile feel of the seat cushion trim cover 28. Further, these surfaces may still stain.

A robust solution is desired which provides active stain prevention. Further, it is desirable to have a solution which disrupts the staining mechanism and is continuous throughout the life of the vehicle. Finally, it is desirable to reduce the retention of staining material by a seat cushion trim cover 28.

The lifetime duty cycles for staining may need to consider a number of factors and applications. Staining is not isolated to leather and vinyl. Cloth staining may also occur. Further, future changes in driving trends may increase the amount of exposure to fabrics that may stain. Examples including ride sharing, car sharing, and autonomous driving may increase vehicle duty cycles.

Effective prevention of staining is based on the nature of staining. Staining occurs based on molecular attraction between two materials. Multiple materials are attracted simultaneously. Some examples are sulfur-based Indigo Blue from jeans (denim), carbon black from soot, and oils of the skin. Each staining medium has a unique way of depositing on a surface. Active stain prevention may cope with multiple staining pathways. Active stain prevention may be based in part on the properties of a targeted stain such as sulfur-based Indigo Blue dye.

Figure 2:
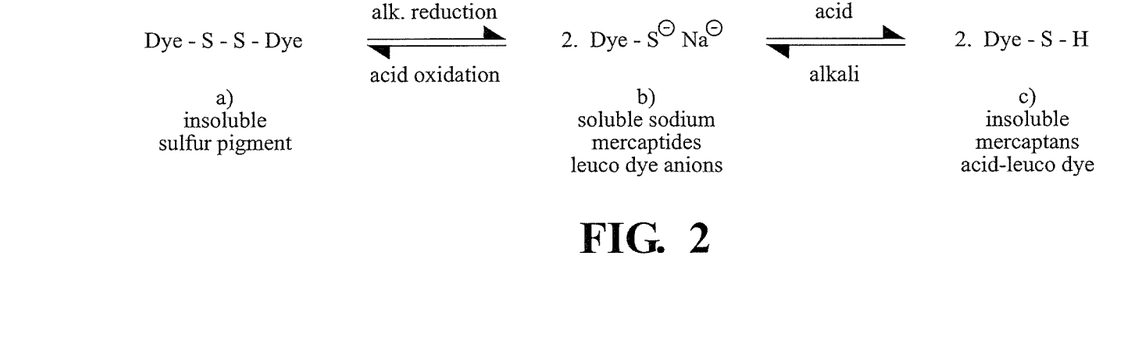
FIG. 2 illustrates generally known sulfur dye functional groups and their dyeing reactions.

FIG. 2 shows a representation of generally known sulfur dye functional groups and their dyeing reactions. During a dyeing procedure, all dyes start out as insoluble pigmented compounds Alkaline reduction breaks the pigment at the S=S bond. The dye is now soluble in water and may permeate cotton fabric. Acid treatment makes the pigment insoluble once again. The cotton must be thoroughly washed to remove any unreacted and non-bound dye molecules. The cotton will be permanently dyed after drying.

Blue jean textile manufacturers may deliberately use materials that allow the sulfur-based Indigo Blue dye to be unbound, creating surface-dyed denim verses penetration-dyed denim. This may create a fading effect on jeans. The dye fixation process may be stopped early which may reduce the net costs of dyeing. When the dye fixation process is stopped early, less chemicals, less water, and less time are required. The unbound dye molecules remaining on the cotton material may freely deposit themselves on any surface contacted by the cotton material. When dyed cotton material rubs against an automotive seating surface, unbound Indigo Blue molecules may be deposited on the automotive seating surface, staining the seating surface. The Indigo Blue dye molecules which have been fixed to the cotton fabric (i.e. bound Indigo Blue molecules) generally resist transferring to surfaces which contact the cotton fabric.

Figure 3:
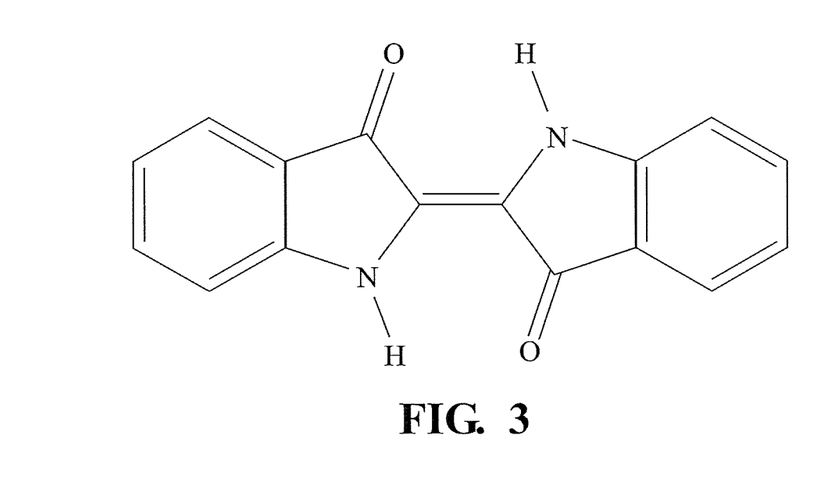
FIG. 3 illustrates a typical sulfur-based Indigo Blue Molecule structure.

Active stain prevention is based on the properties of unbound Indigo Blue molecules. As shown in FIG. 3, unbound Indigo Blue is composed of two chromospheres held together with S=S, sulfur double bond. This bond is susceptible to oxidation-reduction. When the unbound Indigo Blue molecule is exposed to ozone, the bond between the sulfur double bond may break. This also happens naturally as jeans fade. Breaking the sulfur double bond causes the chromospheres to cleave. When the chromospheres cleave, the Indigo Blue molecule chromospheres become colorless. Exposure to low levels of ozone does not visibly affect the color of Indigo Blue molecules which have been fixed to the cotton fabric during the dye fixation process.

As will be described further below, rub tests using low levels of ozone ($O_3$) have shown a reduction in visible Indigo Blue staining on test samples when compared to rub tests lacking exposure to low levels of ozone. When evaluated, fixed blue jean fabrics were unaffected by exposure to ozone.

The automobile industry generally agrees on a standard methodology and test fabric to evaluate the performance of materials. A rub test with a standard staining/soiling test fabric is used to evaluate staining of a test sample (such a leather seat cover). An example rub test may have a swatch of EMPA 128 or Denim Standard 2550Y attached to a weighted applicator having a diameter of about 38 mm and a mass of about 795 grams. The weighted applicator may be rubbed across a target material (such as perforated leather with a light color) for about 1,000 times. The results are graded with a visual 1-5 rating. The test sample may be cleaned with standardized materials. The test sample is re-graded with the visual 1-5 rating to determine cleanability.

Original equipment manufacturers commonly use EMPA 128 and/or Denim Standard 2550Y test fabrics to evaluate staining. EMPA 128 (also referred to as EMPA 128/3 and/or EMPA 129), manufactured by Swissatest® Testmaterialien AG, is a cotton jeans fabric with indigo sulphur black dyeing soiled with sebum with pigment, carbon black as described in IEC 60456, and artificially produced sebum as described in IEC 60456. Denim Standard 2550Y manufactured by Testfabrics, Inc., is a 100% cotton denim dyed indigo (synthetic) 12% black sulfur bottom (synthetic) preshrunk, compressive shrinkage with blended corn starch and wax sizing material. Testfabrics, Inc. also provides EMPA 128.

Figure 4:
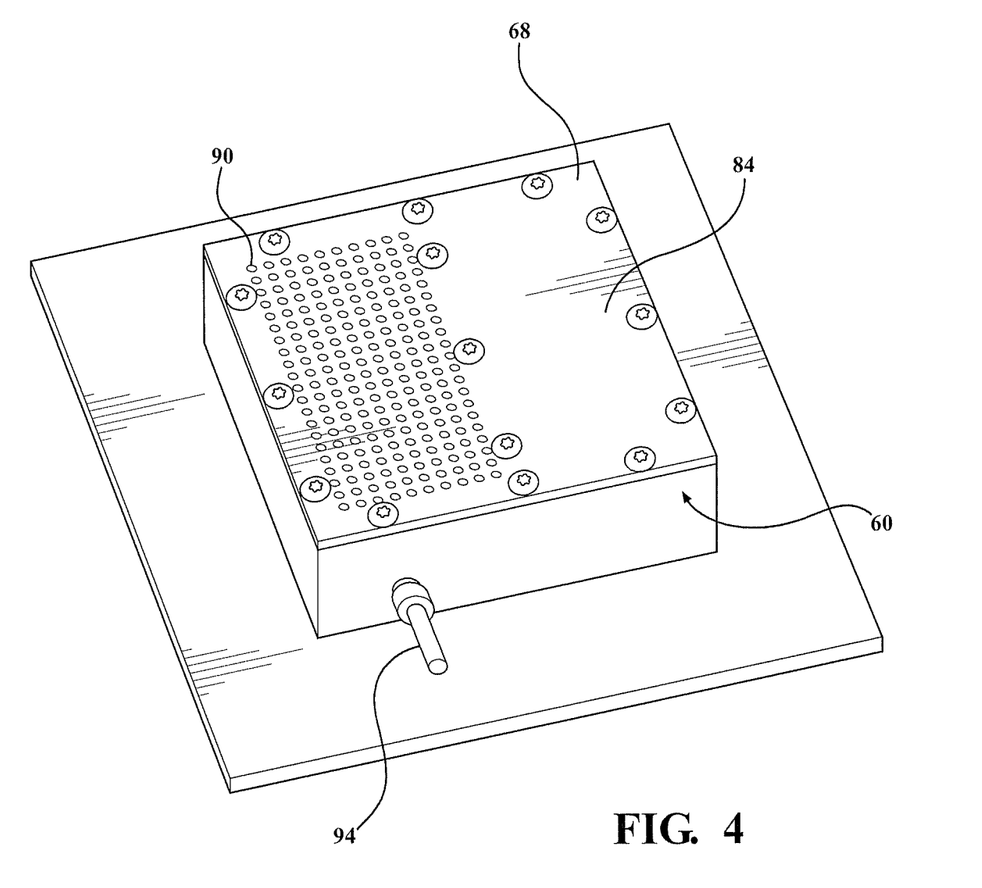
FIG. 4 illustrates a perspective view of a test chamber.
Figure 5:
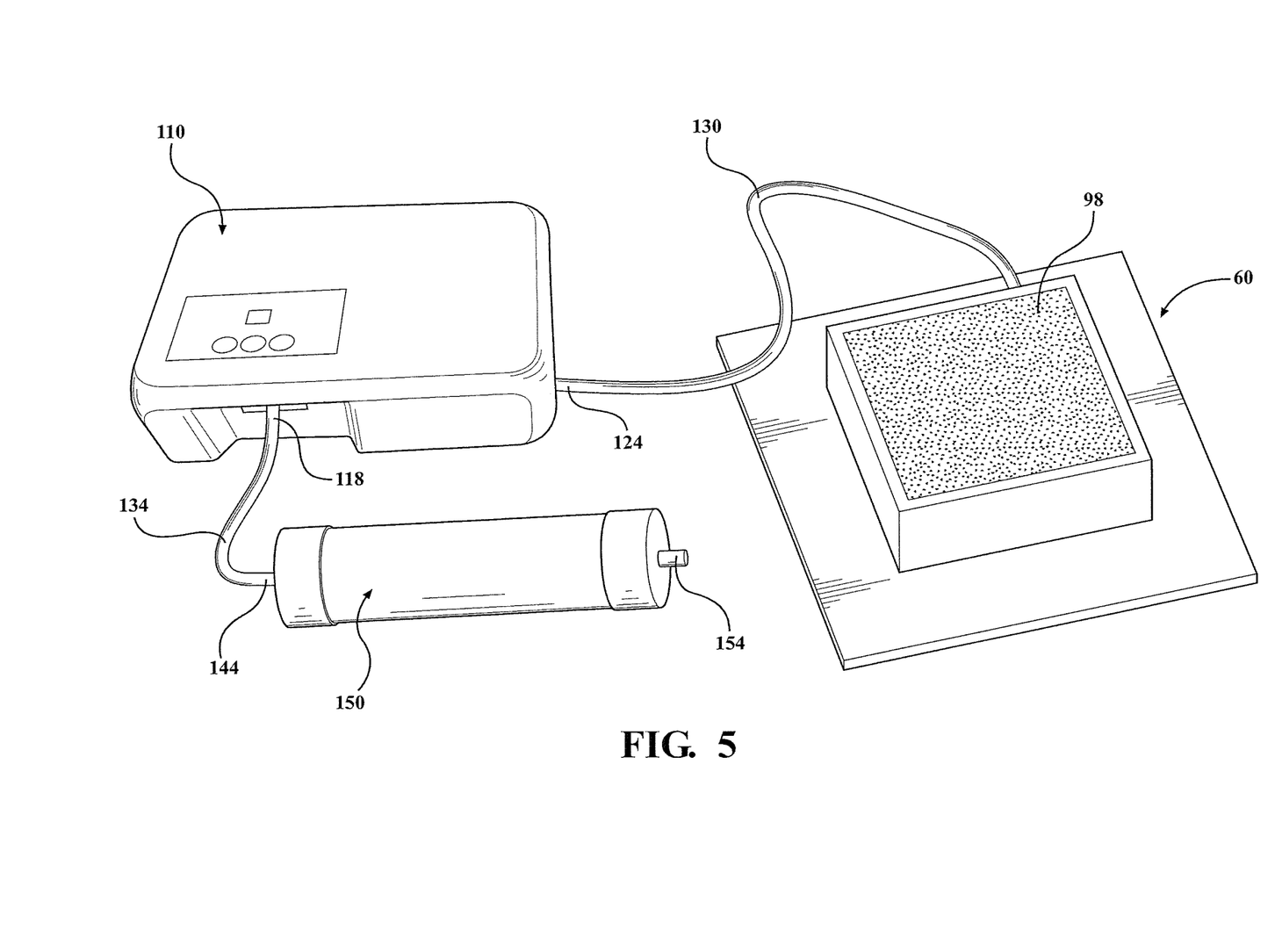
FIG. 5 illustrates a perspective view of the test chamber of FIG. 4 operatively coupled with an ozone generator.

FIGS. 4-7 show an exemplary test chamber 60 and weighted applicator 64 used to evaluate rub test results of EMPA 128 and Denim Standard 2550Y when exposed to ozone and when not exposed to ozone. FIG. 4 shows a test chamber 60 having a generally smooth test surface 68. The generally smooth test surface 68 has a first area with a solid surface 84 and a second area with a perforated surface 90. The test chamber 60 has an airflow inlet 94. When airflow is provided to the airflow inlet nozzle 94, the airflow will travel through the test chamber 64 and exit through the perforated surface 90. As shown in FIG. 5, a felt base layer 98 is placed on top of the test surface 68.

Figure 6:
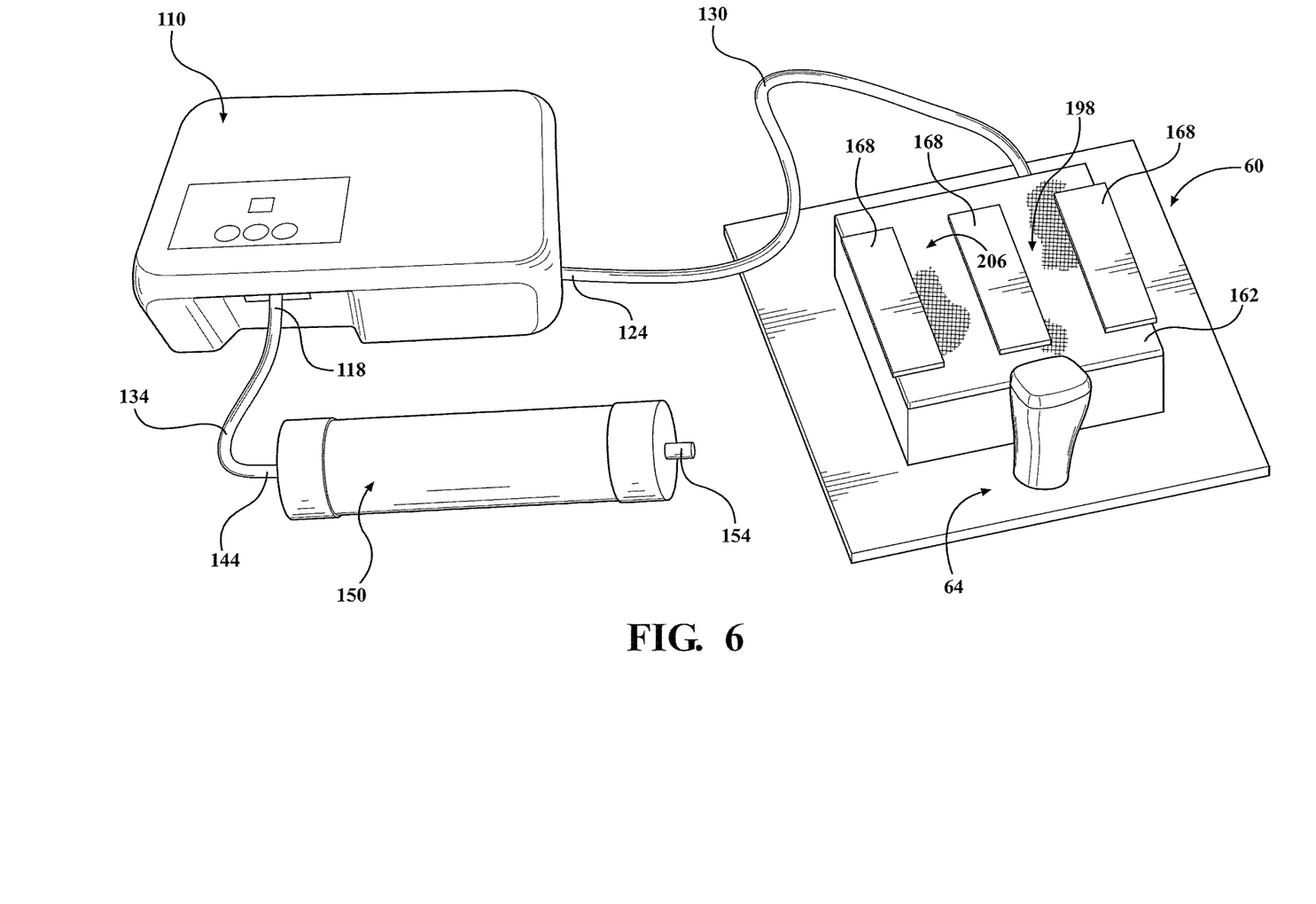
FIG. 6 illustrates a perspective view of the test chamber of FIG. 5 configured with perforated leather test sample.

Referring to FIGS. 5 and 6, an ozone generator 110 (such as Enaly Model 300AT-1-A) has an air intake nozzle 118 and an air outlet nozzle 124. The air outlet nozzle 124 is fluidically coupled with an inlet of a first air tube 130. The first air tube 130 has an outlet fluidically coupled with the air inlet nozzle 94 on the test chamber 64. The air intake nozzle 118 of the ozone generator 110 is fluidically coupled with an air outlet of a second air tube 134. An air inlet of the second air tube 134 is fluidically coupled with an air outlet nozzle 144 of an air dryer 150 (such as Enaly 200 ml Air Dryer Silica Gel Desiccant YN). An air inlet nozzle 154 of the air dryer 150 pulls fresh ambient air into the air dryer 150. Ambient air passes through the air dryer 150, through the second air tube 134 and into the ozone generator 110 inlet nozzle 118. The ozone generator 110 adds ozone to the airflow passing through the ozone generator 110 prior to the airflow entering the first air tube 130. The airflow mixed with ozone passes through the first air tube 130 and enters the test chamber 60.

Figure 7:
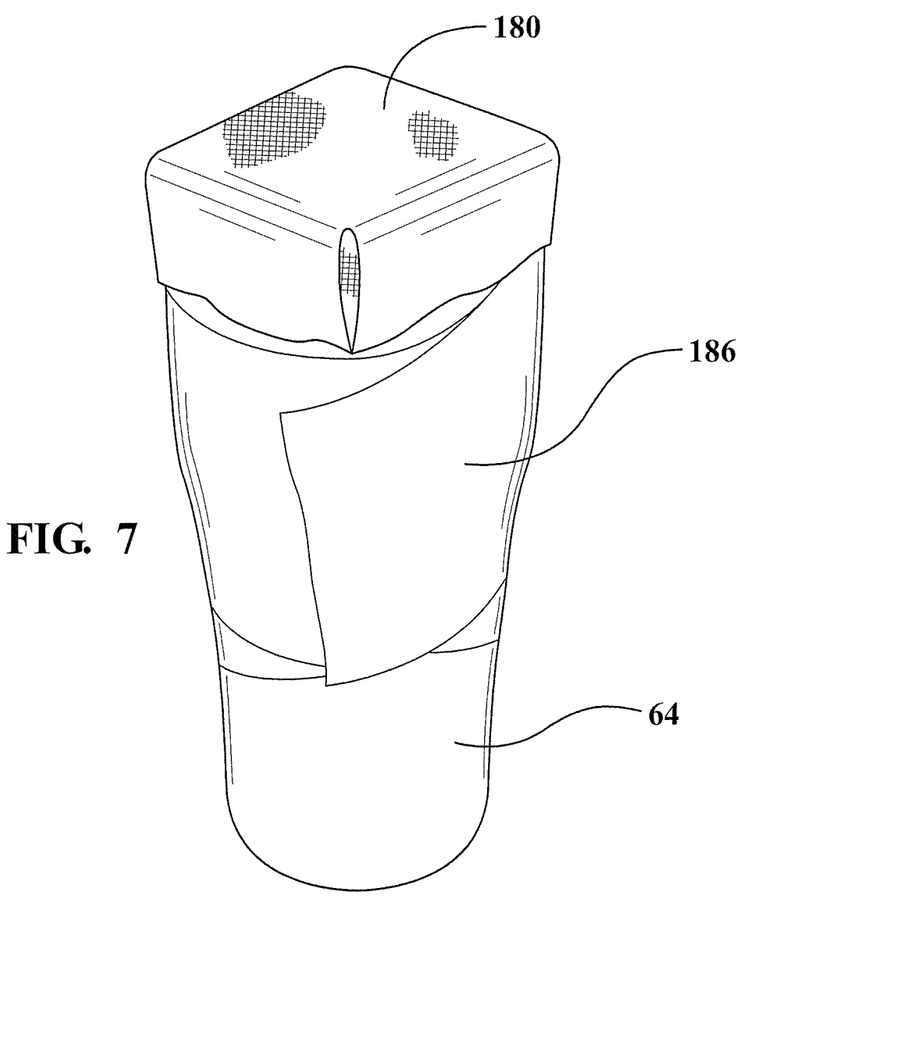
FIG. 7 illustrates a side view of a weighted applicator with test fabric.

A test sample of perforated leather 162 is placed adjacent the felt base layer 98 and fastened to the test chamber 60. Applicator guides 168 are fastened to the test sample 162. A piece of test fabric 180 (such as EMPA 128, Denim Standard 2550Y, or similar) is mechanically fastened around one end of the applicator 64. A fastener 186 such as tape may be used to retain the test fabric 180 against an end surface of the applicator 64. The test fabric 180 fastened to the applicator 64 is rubbed across the surface of the test sample 162 in a channel 198, 206 between two applicator guides 168. When staining caused by the test fabric 180 is to be evaluated in the presence of ozone, the test fabric 180 is rubbed in an ozone-exposing channel 198 against a portion of the test sample 162 above the perforated surface 90. When staining caused by the test fabric 180 is to be evaluated without being exposed to ozone, the test fabric 180 is rubbed in a baseline channel 206 against a portion of the test sample 162 above the solid surface 84. The test fabric 180 may typically be rubbed against the test sample 162 about 1,000 times before the visual results are graded on the 1-5 scale.

Figure 8A:
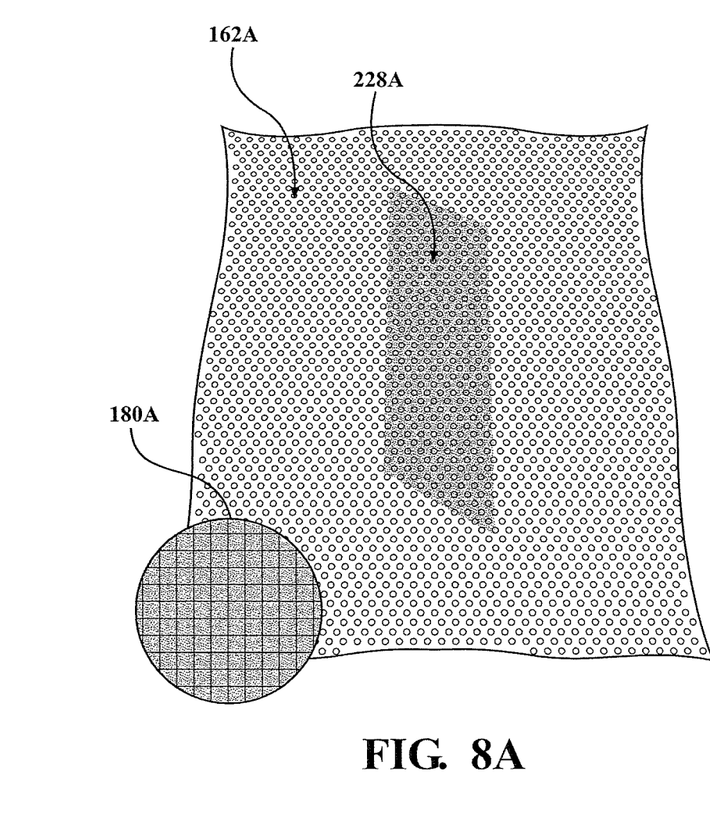
FIG. 8A illustrates visible staining of perforated leather caused by contact with Denim Standard 2550Y fabric.
Figure 8B:
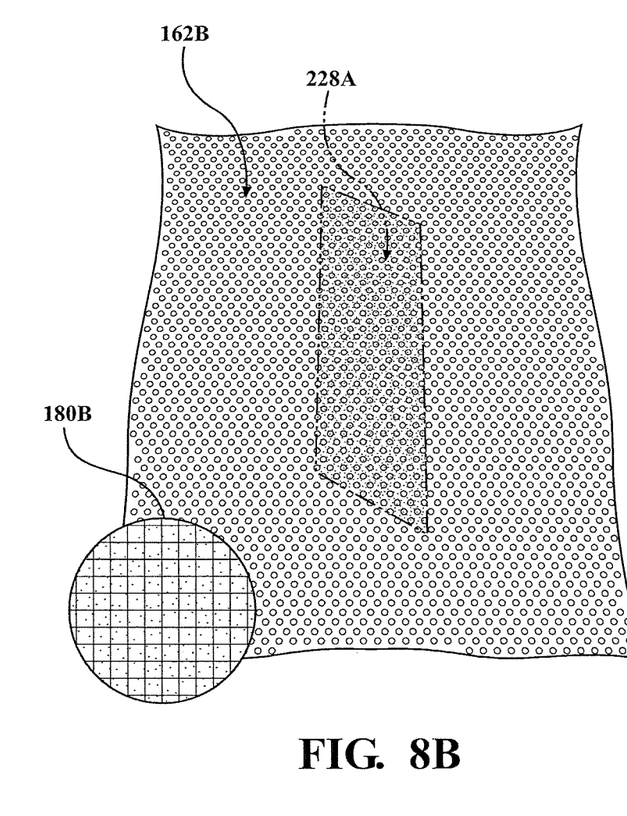
FIG. 8B illustrates visible staining of perforated leather caused by contact with Denim Standard 2550Y fabric when exposed to ozone according to one embodiment of the present invention.

FIGS. 8A and 8B illustrate the visual staining results when a test fabric 180A, 180B of Denim Standard 2550Y was rubbed against a test sample 162A, 162B of perforated leather. FIG. 8A illustrates the staining of the test sample 162A when the Denim Standard 2550Y test fabric 180A was rubbed in channel 206 against the test sample 162A about 1,000 times without being exposed to ozone. A visible stain 228A was observed on the perforated leather test sample 162A as shown in FIG. 8A. The rub test was repeated with a second piece of Denim Standard 2550Y test fabric 180B being rubbed about 1,000 times in channel 198 against the test sample 162B while being exposed to a low level of ozone. Minimal to no staining 228B was observed on the perforated leather sample 162B as shown in FIG. 8B. Further, the visual appearance of the Denim Standard 2550Y test fabrics 180A, 180B after the rub test appear similar, i.e, there is no visually perceivable visual difference in the appearance of the test fabrics 180A, 180B which indicates that the exposure to ozone did not visually affect the ozone-exposed test fabric 180B when compared to the non-ozone exposed test fabric 180A.

Figure 9A:
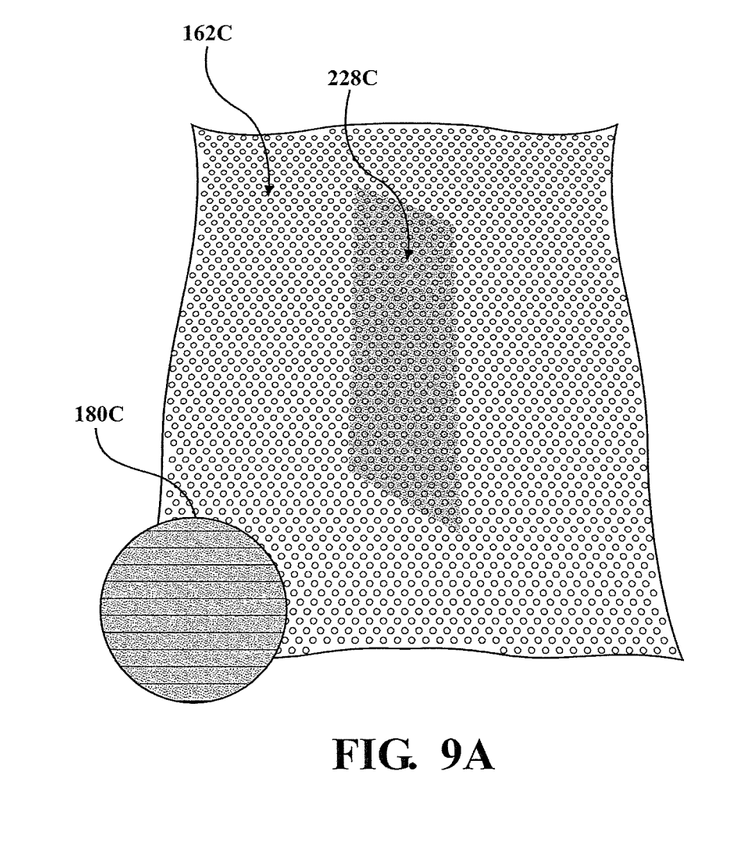
FIG. 9A illustrates visible staining caused by contact with Denim Standard EMPA 128/3 fabric.
Figure 9B:
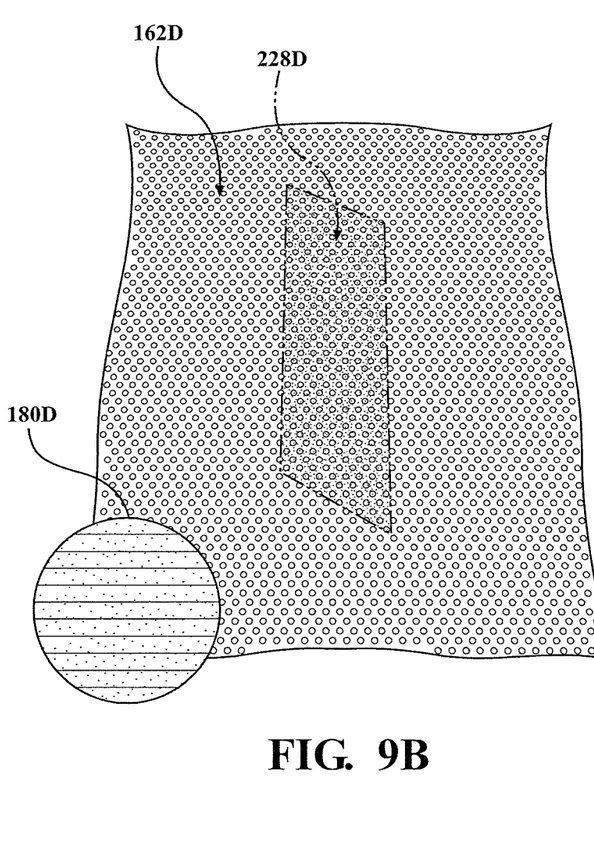
FIG. 9B illustrates visible staining caused by contact with Denim Standard EMPA 128/3 fabric when exposed to ozone according to one embodiment of the present invention.

FIGS. 9A and 9B illustrate the visual staining results when a test fabric 180C, 180D of EMPA 128 was rubbed against a test sample 162C, 162D of perforated leather. FIG. 9A illustrates the staining of the test sample 162C when the EMPA 128 test fabric 180C was rubbed in channel 206 against the test sample 162C about 1,000 times without being exposed to ozone. A visible stain 228C was observed on the perforated leather test sample 162C as shown in FIG. 9A. The rub test was repeated with a second piece of EMPA 128 test fabric 180D being rubbed about 1,000 times in channel 198 against the test sample 162D while being exposed to a low level of ozone. Minimal to no staining 228D was observed on the perforated leather sample 162D as shown in FIG. 9B. Further, the visual appearance of the EMPA 128 test fabrics 180C, 180D after the rub test appear similar, i.e., there is no visually perceivable visual difference in the appearance of the test fabrics 180C, 180D which indicates that the exposure to ozone did not visually affect the ozone-exposed test fabric 180D when compared to the non-ozone exposed test fabric 180C.

The Indigo Blue staining results of the rub tests using Denim Standard 2550Y and EMPA 128 with and without exposure to ozone indicate that low level ozone ($O_3$) exposure is effective at rendering sulfur-based Indigo Blue molecules colorless. Oxidation reduction was achieved on the stained areas 228B, 228D of the test samples 162B, 162D when exposed to ozone. The amount of staining when exposed to ozone was significantly reduced in comparison to the staining when not exposed to ozone. The Indigo Blue staining when exposed to ozone was minimal; however, some staining was visible. The weight of the test samples 162B, 162D before and after staining showed no difference. Because of the ozone concentration levels are low, the test fabrics 180B, 180D are unaffected by the ozone ($O_3$). Therefore, blue jeans will be unaffected by the low levels of ozone. Dyes that are fixed to their cotton substrates remain unaffected by the exposure to ozone. Thus, exposing the test samples 162B, 162D to ozone is an effective strategy to counter Indigo Blue staining. Likewise, exposure to ozone is an effect strategy to counter blue jean staining of automotive seating surfaces.

FIG. 10 illustrates a schematic view of a ventilated seat 10 having active stain prevention, according to the present invention. The seat 10 comprises, in part, the seat cushion 18 fixedly coupled with the seat base 22. The seat back 14 is omitted in FIG. 10. The seat cushion 18 comprises a base foam layer 254, a porous topper pad 260, and a trim cover forming an upper surface layer 266. The upper surface layer 266 may be perforated with through holes 278 and may comprise in part, a leather, vinyl, and/or fabric material. Alternatively, the upper surface layer 266 may be porous.

As shown in FIG. 10, the seat base 22 includes an air inlet 286 on an outer surface. The air inlet 286 is fluidically coupled with an air duct 292 which passes through at least a portion of the seat base 22. A blower fan 298 is be positioned within the air duct 292 or may be fluidically coupled with the air duct and/or the air inlet 286. An ozone generator 304 is be positioned within the air duct 292 and/or may be fluidically coupled with the air duct 292. One or more air channels 310 pass through a portion of the base foam layer 254. Alternatively, the ozone generator 304 may be positioned within an air channel 310 or may be fluidically coupled with an air channel 310. The one or more air channels 310 are fluidically coupled with the air duct 292 in the seat base 22 such that airflow leaving the air duct 292 enters the one or more air channels 310. Airflow may exit through one or more air channel outlets 316, pass through the porous topper pad 260, and pass through the perforations 278 in the upper surface layer 266.

Active stain prevention is achieved by providing low levels of ozone to the airflow passing through the seat 10 and exiting through the upper surface layer 266. Any generally known method of generating ozone may be used. It is desirable to have the ozone generator produce a quantity of ozone such that the concentration of ozone exiting the upper surface layer 266 is maintained at or below about 0.1 parts per million (ppm). The amount of ozone produced by the ozone generator 304 may be greater than about 0.1 ppm near the ozone generator since the ozone is mixed with the airflow within the air duct 292 and/or air channels 310. The generation of ozone passing with the airflow through the upper surface layer 266 mitigates or prevents the transfer of dye onto the surface layer 266 thus preventing staining of the seat 10, Additionally, when low levels of ozone are passed through the upper seat layer 266, the ozone will render at least a portion of sulfur-based indigo blue dye on the outer surface layer 266 colorless by oxidation reduction of sulfur-based indigo blue dye molecules.

One benefit of the active stain prevention is a reduction in visible Indigo Blue staining on automotive seat surfaces. A second benefit is improved appearance of perforated leather used on seat surfaces over the lifetime duty cycle of automotive seating. An additional benefit is an automotive seat which has improved staining resistance which is independent of the condition of any coatings or finishes applied to the automotive seat which may wear over time.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A ventilated seat for an automotive vehicle, said seat comprising:
   a seat base operatively coupled with a seat cushion, said seat cushion operatively coupled with a seat back;
   an airflow channel within at least one of said seat cushion, seat back, and/or seat base;
   a blower fan fluidically coupled with said airflow channel to direct airflow through a portion of said airflow channel and towards an outer seat surface of at least a portion of said seat back and/or seat cushion; and
   an ozone generator fluidically coupled with said airflow channel to provide ozone to said airflow channel which mixes with airflow in said airflow channel;
   wherein said airflow mixed with ozone exits from said seat through said outer seat surface.

2. The ventilated seat as set forth in claim 1, wherein at least a portion of said outer seat surface is porous and/or perforated.

3. The ventilated seat as set forth in claim 2, wherein at least a portion of said airflow mixed with ozone exits from said seat after passing through at least a portion of said seat cushion.

4. The ventilated seat as set forth in claim 3, wherein said ventilation seat comprising an air duct in said seat fluidically coupled with said airflow channel to deliver airflow to said airflow channel.

5. The ventilated seat as set forth in claim 4, said seat cushion comprising a base foam layer, a perforated seating surface, and a porous topper pad between said base foam layer and said perforated seating surface;
   wherein at least a portion of said airflow channel passes through at least a portion of said base foam layer.

6. The ventilated seat as set forth in claim 5, wherein said air duct fluidically coupled with said blower fan to direct airflow through said air duct; and
   wherein said ozone generator provides ozone to said airflow between said blower fan and said outer seat surface.

7. The ventilated seat as set forth in claim 6, wherein at least of portion of said outer seat surface comprises one or more of a leather, a vinyl, and/or a fabric material.

8. The ventilated seat as set forth in claim 7, wherein an amount of ozone passing through said outer seat surface has a concentration equal or less than 0.1 ppm.

9. The ventilated seat as set forth in claim 8, wherein at least a portion of sulfur-based indigo blue dye on said outer seat surface is rendered colorless by oxidation reduction of sulfur-based indigo blue dye molecules.

10. A ventilation system for an automotive seat having active stain prevention, said ventilation system comprising:
    a blower fan fluidically coupled with an air duct;
    said air duct fluidically coupled with an airflow channel;
    an ozone generator supplying ozone to airflow in one or more of said air duct and/or airflow channel; and
    said airflow channel having an airflow channel outlet wherein at least a portion of said airflow leaving said airflow channel outlet passes through an outer seat surface of said automotive seat.

11. The ventilation system as set forth in claim 10, wherein at least a portion of said outer seat surface is porous and/or perforated.

12. The ventilation system as set forth in claim 11, said automotive seat comprising a seat base operatively coupled with a seat cushion which is operatively coupled with a seat back;
    wherein at least a portion of said airflow mixed with ozone exits from said seat through said seat cushion.

13. The ventilation system as set forth in claim 12, wherein:
    at least a portion of said air duct passes through a portion of said seat base; and
    at least a portion of said airflow channel passes through a portion of said seat cushion.

14. The ventilation system as set forth in claim 13, wherein an amount of ozone passing through said outer seat surface has a concentration equal or less than 0.1 ppm.

15. The ventilation system as set forth in claim 14, said seat cushion comprising a base foam layer, a perforated seating surface, and a porous topper pad between said base foam layer and said perforated seating surface;
    wherein at least a portion of said airflow channel passes through at least a portion of said base foam layer; and
    at least a portion of said airflow leaving said airflow channel outlet passes through said perforated seating surface.

16. The ventilation system as set forth in claim 15, wherein at least a portion of sulfur-based indigo blue dye on said outer seat surface is rendered colorless by oxidation reduction of sulfur-based indigo blue dye molecules.

17. A method of reducing staining of an automotive seat, said method comprising:
    providing an automotive seat having a ventilation system which provides airflow towards an outer seat surface;
    adding ozone to said ventilation system; and
    passing said ozone through at least a portion of said ventilation system; and
    providing said ozone to at least a portion of said outer seat surface.

18. The method as set forth in claim 17, said method comprising:
    providing at least a portion of said outer seat surface having a perforated and/or porous surface.

19. The method as set forth in claim 18, said method comprising:
    providing an amount of ozone passing through said outer seat surface having a concentration equal or less than 0.1 ppm.

20. The method as set forth in claim 19, said method comprising:
    rendering at least a portion of sulfur-based indigo blue dye on said outer seat surface colorless by oxidation reduction of sulfur-based indigo blue dye molecules.

* * * * *